UNITED STATES PATENT OFFICE.

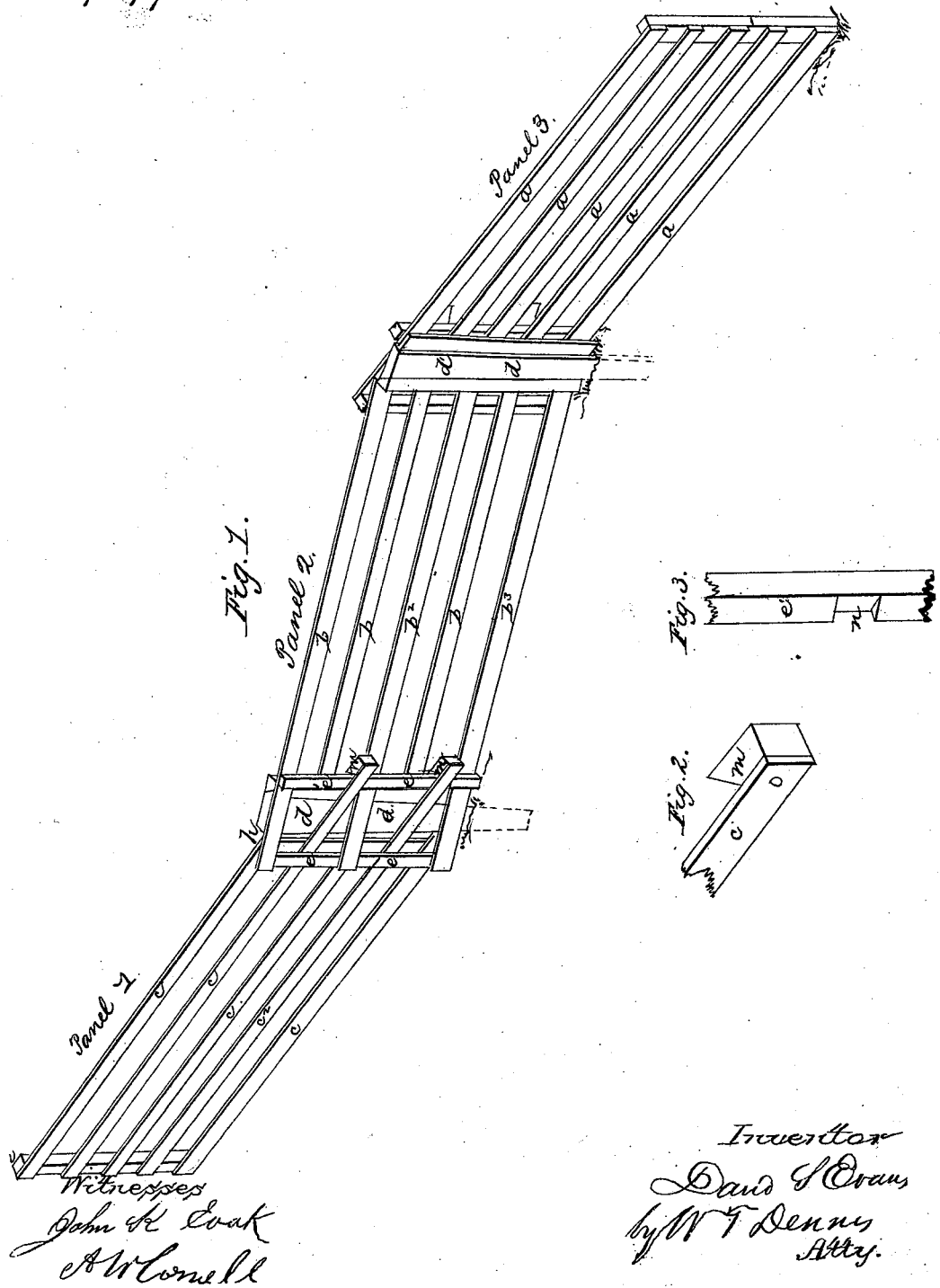

DAVID S. EVANS, OF RICHMOND, INDIANA.

IMPROVEMENT IN FENCES.

Specification forming part of Letters Patent No. 59,199, dated October 30, 1866.

*To all whom it may concern:*

Be it known that I, DAVID S. EVANS, of Richmond, Indiana, have invented certain new and useful Improvements in Portable Fences; and I do hereby declare the following to be a full, clear, and exact description of the same, reference being had to the accompanying drawings, and to the letters of reference marked thereon.

In the drawings, Figure 1 is a perspective view of three panels of my improved fence. Fig. 2 represents the end of one of the planks provided with a catch. Fig. 3 is a section of one of the upright bars provided with a beveled gain.

In Fig. 1, panel 1, $c\ c\ c\ c\ c$ are the boards of which the fence is constructed, parallel with each other, as in the ordinary method of construction, the ends being attached, respectively, to the posts or bars $e$ and $h$. The planks or boards $c^1$ and $c^2$ extend a proper distance beyond the bar $h$, and are provided with a catch, $m$. The bar $e'$ is constructed with gains $n$ to receive the catch $m$.

$d$, Fig. 1, is a wedge-post fitting the space between the upright bars $h$ and $e'$, so beveled as to form a joint with the inner surfaces of the same, and sufficiently tapering to act as a wedge to press the joints of the corner firmly together, and the lower end of sufficient length to be driven into the ground, forming a standard or support for the fence.

To put up my fence for use, the panels are constructed as shown in panel 2, Fig. 1, and the wedge-posts as shown at $d$ and $d'$, Fig. 1. The corners are interlocked, as is also shown, and the panels brought toward a straight line until they are brought up tight in their bearings, when the wedge-post $d$ is inserted and driven home in the opening into the ground, bringing the ends of the panels to a mutual bearing, and by its entering into the ground preventing any lateral motion of the fence by reason of winds or other pressure.

Having thus fully described my said improvement, what I claim as my invention, and desire to secure by Letters Patent, is—

The arrangement and combination of the wedge-post $d$, the catch $m$, and bevel $n$, when used in a portable fence, all arranged and operating as set forth and described.

DAVID S. EVANS.

Witnesses:
WM. T. DENNIS,
A. W. CORNELL.